K. SIEMS.
MEANS FOR DUST PROOFING ROTARY GEAR CASES.
APPLICATION FILED MAY 1, 1919.

1,357,735.  Patented Nov. 2, 1920.

Inventor
Kurt Siems
By
Thurston Kwis & Hudson
attys.

UNITED STATES PATENT OFFICE.

KURT SIEMS, OF EAST CLEVELAND, OHIO, ASSIGNOR TO THE CLEVELAND TRACTOR COMPANY, OF EUCLID, OHIO, A CORPORATION OF OHIO.

MEANS FOR DUST-PROOFING ROTATING GEAR-CASES.

1,357,735.  Specification of Letters Patent.  Patented Nov. 2, 1920.

Application filed May 1, 1919. Serial No. 294,057.

*To all whom it may concern:*

Be it known that I, KURT SIEMS, a citizen of Germany, residing at East Cleveland, in the county of Cuyahoga and State of Ohio, have invented a certain new and useful Improvement in Means for Dust-Proofing Rotating Gear-Cases, of which the following is a full, clear, and exact description.

In certain kinds of motor vehicles, as for example, trucks and tractors, the driving wheels are hollow and contain an internal ring gear; and each of said wheels is rotated by a pinion which engages said ring gear, and is fixed to a shaft that in turn is mounted in bearings carried by the main frame of the vehicle.

In such constructions it is common to employ a non-rotating disk fitted into the open side of the wheel for the purpose of closing the chamber within the wheel and thereby creating an inclosed gear case.

The object of this invention is to make such a joint between the rotating wheel and the nonrotating disk as will effectually exclude dust, mud, water and the like, and will also prevent the escape of oil from said gear case.

The invention consists in the construction and combination of parts hereinafter described and definitely pointed out in the appended claims.

Figure 1:
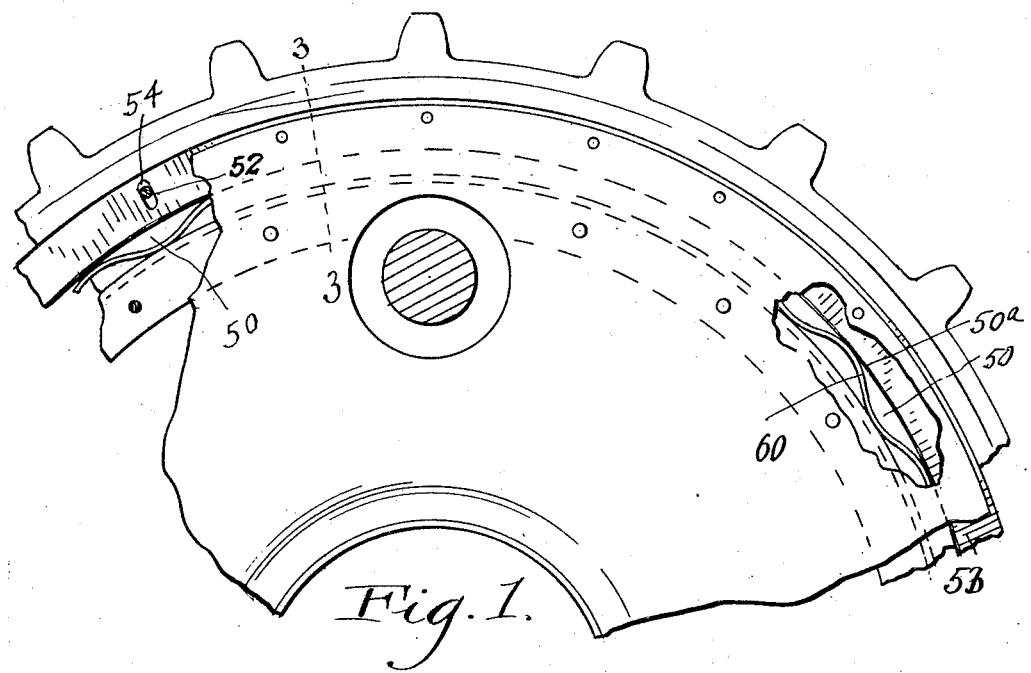
Figure 2:
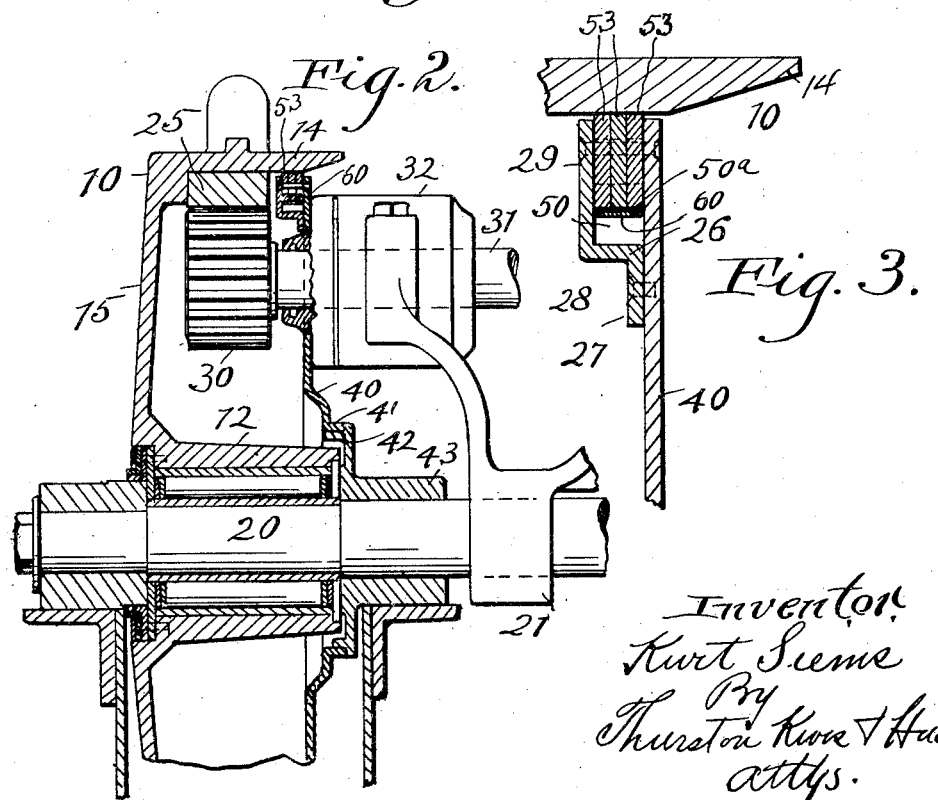
Figure 3:
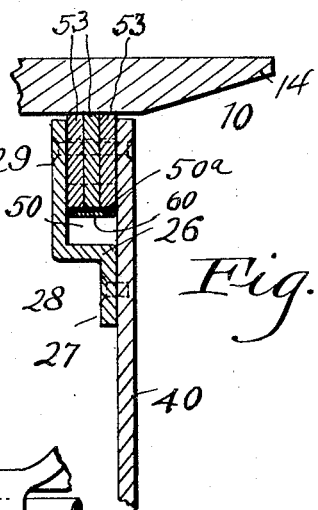

In the drawing, Figure 1 is a side view of the inner side of a wheel to which said invention is applied,—a segment only of said wheel being shown,—and a part of the disk, 40, being broken away. Fig. 2 is a central vertical section of somewhat more than one half of said wheel; and Fig. 3 is an enlarged radial section in the plane of line 3—3 on Fig. 1.

The invention is exemplified in connection with the driving sprocket wheel of a track laying tractor of the type which is disclosed in Patent No. 1,275,344; but obviously the invention is not limited to this particular use.

The wheel 10 as shown is formed with a hub 12, a concentric cylindrical flange 14, and an outside plate 15 which connects the hub and rim and is integral with both, and furnishes the outside wall of the gear case within the wheel. The hub is rotatably supported upon a nonrotating axle 20 which is secured in a bracket 21 which, it will be understood, is to be fixed to the main frame of the vehicle. The internal gear ring 25 is fitted and secured within the cylindrical flange 14. A pinion 30, within the wheel, meshes with this ring gear, and is fixed to the rotating driving shaft 31 which is rotatably mounted in a bearing bracket 32 which is also fixed to the main frame of the machine.

A circular disk 40 embraces this shaft 31 and is rigidly secured to the end of the bearing bracket 32 in such position that it lies within the flange 14 of the wheel. This disk 40 of course embraces and surrounds the axle 20 and has at the margin of the hole through which such shaft passes a cylindrical flange 41 which fits a cylindrical flange 42 formed on a member 43 which loosely embraces the axle 20.

To the extent above described the construction as shown is substantially like that shown on the above mentioned prior patent. The present invention, as before stated, has to do with the means for making a dust and water tight joint between the flange 14 of the wheel and this disk 40.

To accomplish this result an annular sheet metal packing supporter 26 is provided. This has a portion 27 which lies against and is secured to the outside face of the disk 40; a cylindrical portion 28; and a portion 29 which is parallel with the disk 40. There is thereby formed an annular channel 50 of which the cylindrical part 28 forms the inner wall, and of which the disk 40 and the part 29 form the side walls. In this channel one or more rings 53 of easily deformed packing material (preferably felt) are clamped between the disk 40 and the part 29; and these rings extend out of the channel into contact with the inner cylindrical wall of the flange 14. At intervals rivets 52 which extend between and are fixed to disk 40 and to the part 29 of the packing supporter, also extend through radial slots 54 in said packing rings. This prevents the turning of the packing rings in the channel, but permits such movement of the rings away from the axis of the wheel as may be required to maintain contact between the outer peripheries of said packing rings and the inner surface of flange 14. The width of these packing rings is not as great as the depth of channel 50, and therefore there is an annular space between the annular base 28 of the channel, and the inner peripheries of the packing rings. In this annular space is a sinuous ring 60 of spring metal which is put under tension such that it exerts at many points outward pressure upon the packing rings, pushing them against the inner surface of flange 14. The outer peaks of this spring ring are so close together that the parts of the packing rings between the points where those peaks press against the packing rings, will also be held in dust tight contact with flange 14. It is perhaps desirable even if not necessary to interpose between the packing rings and spring a thin metal strip 50ª which is bent to form an annulus and has overlapping ends. In that event the spring will exert its pressure upon this metal ring which will transmit it to the packing rings.

Having described my invention, I claim:

1. The combination of a rotatable hollow wheel having a concentric cylindrical flange, a nonrotating disk having at its periphery an annular packing channel which lies within said flange, a ring of easily deformable packing material within said channel, and a sinuous annulus of spring metal located in said channel between the inner periphery of said packing ring and the base of said channel, exerting pressure at many points against the packing ring to force it outward into contact with said cylindrical flange.

2. The combination of a hollow wheel having a concentric cylindrical flange, an internal gear ring secured coaxially to the wheel within said flange, a rotatable shaft which projects into said wheel, a pinion fixed to the inner end thereof in meshing relation with said internal gear ring, a bearing bracket in which said shaft is mounted, a disk fixed to said bearing bracket having at its periphery an annular packing channel which lies within said flange, a ring of easily deformable packing material within said channel, and a sinuous annulus of spring metal in said channel between the base of the channel and the inner periphery of said packing ring, exerting pressure at many points against the packing ring to force it into contact with said flange.

3. The combination of a rotatable hollow wheel having a concentric cylindrical flange, a nonrotating disk located within said cylindrical flange, a packing holding annulus having a portion which lies against and is fixed to the outer face of said disk, another portion which is substantially coaxial with the wheel, and a portion which extends radially outward and is substantially parallel with the disk, thereby forming a three-sided annular channel, a ring of easily deformable packing material in said channel tightly fitted between said disk and the part of the packing holder which is parallel thereto, and a sinuous spring annulus in said channel between the bottom thereof and the inner periphery of the packing ring and exerting outward pressure upon many points upon said packing ring to force it into contact with said cylindrical flange.

4. The combination of a rotatable hollow wheel having a concentric cylindrical flange, a nonrotating disk located within said cylindrical flange, a packing holding annulus having a portion which lies against and is fixed to the outer face of said disk, another portion which is substantially coaxial with the wheel, an inner portion which extends radially outward and is substantially parallel with the disk thereby forming a three-sided annular channel, a ring of easily deformable packing material in said channel tightly fitted between said disk and the part of the packing holder which is parallel thereto, said packing ring having a plurality of radial slots, rivets passing through said slots, and secured to said disk and to the packing supporting ring, and a sinuous spring annulus in said channel between the bottom thereof and the inner periphery of the packing ring and exerting outward pressure upon many points upon said packing ring to force it into contact with said cylindrical flange.

In testimony whereof, I hereunto affix my signature.

KURT SIEMS.